UNITED STATES PATENT OFFICE.

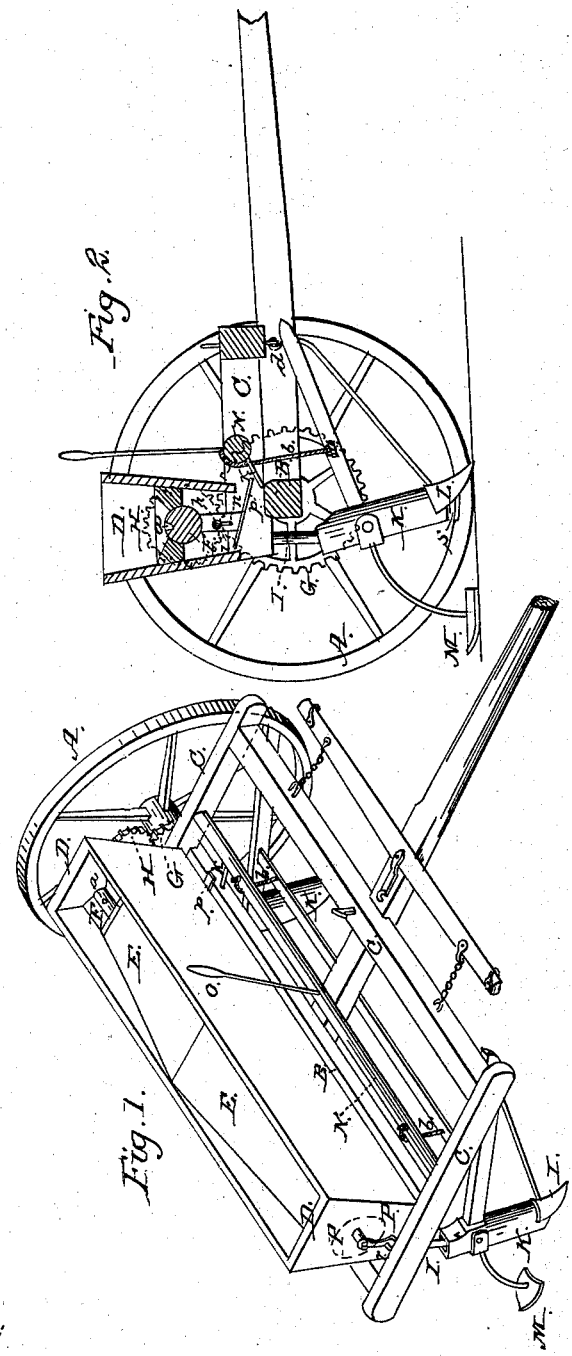

JOHN GROSS, OF DECATUR, ILLINOIS.

IMPROVEMENT IN CORN-PLANTERS.

Specification forming part of Letters Patent No. 26,670, dated January 3, 1860.

*To all whom it may concern:*

Be it known that I, JOHN GROSS, of Decatur, in the county of Macon and State of Illinois, have invented certain new and useful Improvements in Corn-Planters; and I do hereby declare that the following is a full, clear, and exact description of the construction and operation of the same, reference being had to the accompanying drawings, in which—

Figure 1 represents a perspective view of said corn-planter. Fig. 2 represents a longitudinal vertical section through the same.

In the corn-planters which are drawn by horses, and wherein the dropping devices are operated from the driving-wheels by means of gearings or otherwise, it frequently happens that when the longitudinal furrows of the field are crossed by the machine for the purpose of planting in hills the dropping device does not drop the corn at the exact place in the furrow, and that thus the corn is not planted in straight rows.

My invention relates to an arrangement for adjusting the position of the dropping device independently of the gearing and driving-wheel, so that the operator may be enabled to drop the corn to the exact place in the furrows.

To enable others skilled in the art to make and use my invention, I will proceed to describe its construction and operation.

A represents the driving-wheel, which turns on the axle B, and which latter supports the frame C of the machine.

D represents the seed-box, which contains the corn to be planted.

E are two inclined boards in the seed-box, on which the corn slides down toward the ends of said box to drop into seed-cells, the dropping devices being arranged at the ends of said seed-box.

F represents a cylindrical shaft, which has its bearings in the ends of the seed-box. This shaft is revolved by means of the cogged wheels G and H, the former of which is secured to one of the driving-wheels, while the latter is secured to the shaft F, on the outside of the seed-box.

*a* represents the seed-cells. They are cut into the shaft F near its ends, and when the latter is turned the corn is dropped from said cells into the seed-tubes I and K, and thence into the furrows made by the plows L, and it is then covered by the coverers M.

The bearings of the shaft F, near the wheel H, is such that that end of the shaft can be raised sufficiently to disconnect the wheels G and H from each other, so that said shaft may be turned independently from the driving-wheel for the purpose of adjusting the position of the seed-cells. This is done by the following devices:

N is a shaft in front of the seed-box, which has its bearings in the frame C, and which can be turned by means of a lever, O.

*b b* are cords or chains, which are secured to the shaft N, and to which the hinged seed-tubes K are hung, and by which they can be raised or lowered on their hinges *d* by operating the lever O.

*h* represents a slide, which is secured to the end of the seed-box, near the wheel H. The upper end of the slide may be of circular shape, and is in contact with the lower side of the shaft F. This slide is secured within a groove of the box D by means of a pin or screw, *i*, which passes through a slot, *n*, and it may be raised or lowered on the pin *i*. The slide *h* is raised by the action of a pin, *k*, of the shaft N, which, when the latter is turned, comes in contact with the projection *p* of a slide, *h*, and thus the end of the shaft F is raised and the wheels H and G are disconnected from each other.

*r* represents a hand or index, which is secured to the end of the shaft F on the outside of the box D. The shaft F can be turned by means of this hand, and the position of its seed-cells can be adjusted by setting said index to the desired point of the graduated circle P.

The operation of the machine is as follows:

Preparatory to the planting, the longitudinal furrows are made in equal distances on the field. When this is done, the machine is drawn over the field at right angles to those furrows, and the corn is dropped by the machine at each crossing; but should the machine not drop the corn exactly at the crossing, and thereby plant the corn irregularly, then the lever O is operated, and shaft N is turned, which will immediately disconnect the dropping devices from the driving-wheel, and the shaft F can now be turned by means of the hand *r* to such a position, either forward or back, as will cause it to drop the corn in the exact crossings of the furrows, and this can be done without arresting the motion of the machine, for if it is dropping, say, six inches ahead of the exact point, the seeding roller or shaft is turned so that it will deposit the grains in the furrow or crossing, and it will then go on automatically and drop regularly, as described.

A distributing or scattering plate, *s*, may be placed at the bottoms of the seed-tubes, to spread the grains and not allow them to lie one on the other.

Having thus fully described the nature of my invention, what I claim therein as new, and desire to secure by Letters Patent, is—

1. In combination with a revolving shaft of a corn-planter having seed-cells in its circumference, the slide *h* and levers *p k*, for raising and disconnecting said shaft from the driving-wheel, substantially in the manner and for the purpose herein described.

2. In combination with the lifting devices *h,p*, and *k*, the adjusting of the position of the seed-cells in the revolving shaft F by hand, to make them drop the grain at exact points independently of and without turning either of the gearing and driving wheels—viz., by means of an index or hand, *r*, secured to said shaft F—substantially in the manner and for the purpose herein described, and said shaft at the same time detached from the axle or driving-wheel, as set forth.

JOHN GROSS.

Witnesses:
JOHN R. MILLER,
ISAAC D. JENNINGS.